United States Patent Office 3,063,983
Patented Nov. 13, 1962

3,063,983
ALKALI METAL SALTS OF DICARBOXYLIC ACID MONO-ESTERS OF CARBAMIDE ESTERS OF SUGARS
Mathieu Quaedvlieg, Leverkusen-Bayerwerk, and Georg Matthaeus, Leverkusen, Germany, assignors to Farbenfabriken Bayer Aktiengesellschaft, Leverkusen, Germany, a corporation of Germany
No Drawing. Filed Nov. 17, 1959, Ser. No. 853,457
Claims priority, application Germany Nov. 27, 1958
5 Claims. (Cl. 260—234)

The present invention relates to sugar esters and to a process of producing the same. The process consists in reacting sugar carbamic acid esters, in particular carbamic acid esters of di- or oligosaccharides as they are obtainable according to the process of our co-pending application Serial No. 750,593, filed July 24, 1958, with carboxylic acid anhydrides and converting the acid esters thus formed into their salts, advantageously already during their formation.

As examples of sugar carbamic acid esters there may be mentioned the reaction products of sucrose, maltose, lactose or raffinose with isocyanates such as stearyl, cetyl, myristyl, dodecyl or phenyl isocyanate. Suitable dicarboxylic acid anhydrides are, for example, maleic acid, succinic acid and phthalic acid anhydrides.

The reaction of the dicarboxylic acid anhydrides with sugar carbamic acid esters is preferably carried out in a solvent with heating, e.g. in dimethyl formamide; to this effect, the dicarboxylic acid anhydrides are advantageously used in equimolecular quantities or in excess.

In general, the alkali metal carbonates are used for the conversion of the acid esters into their salts.

Compared with the sugar carbamic acid esters the ester salts of sugar carbamic acid esters obtained according to the process of the present invention are distinguished by a higher water-solubility and an increased surface activity. On account of their great surface activity, they may be used in the first instance as detergents.

An especially advantageous method of carrying out the present invention consists in reacting maleic acid anhydride with sugar carbamic acid esters and subsequently converting the acid esters obtained in the form of their salts into the salts of sulfo-succinic acid esters, for example with the aid of sodium bisulphite.

The following examples serve to illustrate the present invention without, however, limiting the scope thereof; the parts are parts by weight.

Example 1

300 parts of saccharose stearyl carbamic acid monoester prepared according to Example 3 of application Serial No. 750,593 and 50 parts of maleic acid anhydride are heated to 90–100° C. for about 5–6 hours in 2500 parts of dimethyl formamide with the addition of 35 parts of sodium carbonate. The dimethyl formamide is then distilled off in vacuum from the reaction mixture.

The potassium salt of the acid maleic acid ester of the stearyl carbamic acid ester of saccharose obtained is recrystallised e.g. from alcohol with the addition of bleaching earth and/or active charcoal. The light-coloured product obtained dissolves in water giving a clear and colourless solution.

100 parts of the potassium salt of the acid maleic acid ester of the saccharose stearyl carbamic acid monoester are then treated with 100 parts of a 40% aqueous sodium bisulphite solution and the mixture is heated to 90–100° C. for about 2 hours with stirring. After removing the water under vacuum, a powdery product is obtained which dissolves clearly in water and is highly suitable for use as detergent.

The saccharose stearyl carbamic acid monoester used is prepared as follows: 150 parts of saccharose are dissolved in 500 parts of anhydrous dimethyl formamide and heated with 30 parts of stearyl isocyanate for 1 to 2 hours with stirring, to about 100° C. The dimethyl formamide is then distilled off in vacuum. In the remaining residue there is found, apart from the excess sugar, the saccharose stearyl carbamide monoester with a certain proportion of higher esters.

Example 2

29 parts of raffinose dodecyl carbamic acid monoester and 7.4 parts of phthalic acid anhydride are dissolved in 200 parts of dimethyl formamide and heated for 5–6 hours to 90–100° C. in the presence of 3.5 parts of potassium carbonate. After distilling off the dimethyl formamide in vacuum the reaction product is recrystallized from alcohol with the addition of bleaching earth and/or active charcoal. The potassium salt of the acid phthalic acid ester of the dodecyl carbamic acid ester of raffinose is thus obtained in solid form, which gives clear solutions in water.

The raffinose dodecyl carbamic acid monoester used was prepared in the following manner:

150 parts of raffinose were dissolved in 1000 parts of anhydrous dimethyl formamide and 21.1 parts of dodecyl isocyanate were added in the course of an hour at 70–80° C. After distilling off the solvent in vacuum the residue was treated with a mixture of butyl alcohol and sodium chloride solution in order to remove the unreacted raffinose. On concentrating the alcoholic solution by evaporation the raffinose dodecyl carbamic acid monoester was obtained in solid form.

Example 3

25 parts of saccharose phenyl carbamic acid monoester and 7.4 parts of phthalic acid anhydride are heated for 5 to 6 hours in 200 parts of dimethyl formamide to 90–100° C. in the presence of 3.5 parts of potassium carbonate. After distilling off the dimethyl formamide in vacuum the residue is recrystallized from alcohol with the addition of bleaching earth and/or active charcoal. The potassium salt of the acid phthalic acid ester of the phenyl carbamic acid ester of saccharose is thus obtained in the form of a powder which gives a clear solution in water.

The saccharose phenyl carbamic acid monoester was prepared in the following manner:

342 parts of saccharose were dissolved in 1000 parts of anhydrous dimethyl formamide and 24 parts of phenyl isocyanate were added in the course of an hour at 70–80° C. After distilling off the solvent in vacuum the residue was treated with a mixture of butyl alcohol and sodium chloride solution in order to remove the unreacted saccharose. On concentrating the alcoholic solution by evaporation the saccharose phenyl carbamic acid monoester was obtained in solid form.

We claim:
1. Alkali salts of dicarboxylic acid mono-esters of carbamic acid esters of di- and trisaccharides of the formula M—X—Y wherein M stands for an alkali metal, X is the radical of a member of the group consisting of a dicarboxylic acid and sulfosuccinic acid, and Y is the radical of a member of the group consisting of carbamic acid esters of disaccharides and carbamic acid esters of trisaccharides, the radicals X and Y being combined with each other by an ester group formed by a hydroxyl group of the saccharides and a carboxyl group of the dicarboxylic acids.

2. A product of the formula

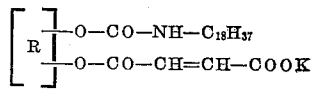

in which R is a saccharose residue.

3. A product of the formula
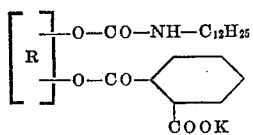
in which R is a saccharose residue.
4. A product of the formula
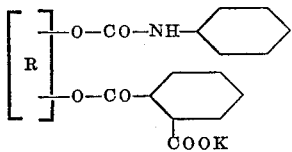
in which R is a saccharose residue.
5. A product of the formula
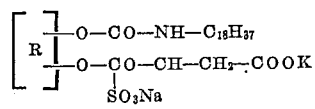
in which R is a saccharose residue.
References Cited in the file of this patent
UNITED STATES PATENTS
| | | |
|---|---|---|
| 2,211,338 | Malm et al. | Aug. 13, 1940 |
| 2,527,839 | Morton | Oct. 31, 1950 |
| 2,602,789 | Schwartz et al. | July 8, 1952 |
| 2,628,249 | Bruno | Feb. 10, 1953 |
| 2,661,349 | Caldwell et al. | Dec. 1, 1953 |
| 2,723,283 | DeGroote | Nov. 8, 1955 |
| 2,958,704 | Dinbergs et al. | Nov. 1, 1960 |
FOREIGN PATENTS
| | | |
|---|---|---|
| 1,040,525 | Germany | Oct. 9, 1958 |